(12) United States Patent
Zahn et al.

(10) Patent No.: US 10,494,552 B2
(45) Date of Patent: Dec. 3, 2019

(54) STORAGE-STABLE, MOISTURE-CURING POLYURETHANE ADHESIVE WITH RAPID ADHESIVE FORMATION ON GLASS

(71) Applicant: SIKA TECHNOLOGY AG, Baar (CH)

(72) Inventors: Alain Zahn, Uster (CH); Michael Schlumpf, Stallikon (CH); Urs Burckhardt, Zürich (CH)

(73) Assignee: SIKA TECHNOLOGY AG, Baar (CH)

(*) Notice: Subject to any disclaimer, the term of this patent is extended or adjusted under 35 U.S.C. 154(b) by 4 days.

(21) Appl. No.: 15/505,822

(22) PCT Filed: Sep. 22, 2015

(86) PCT No.: PCT/EP2015/070117
§ 371 (c)(1),
(2) Date: Feb. 22, 2017

(87) PCT Pub. No.: WO2016/045927
PCT Pub. Date: Mar. 31, 2016

(65) Prior Publication Data
US 2017/0275509 A1   Sep. 28, 2017

(30) Foreign Application Priority Data
Sep. 22, 2014 (EP) .................... 14185761

(51) Int. Cl.
| | | |
|---|---|---|
| C09J 175/04 | (2006.01) | |
| C08G 18/76 | (2006.01) | |
| C08G 18/16 | (2006.01) | |
| C08G 18/20 | (2006.01) | |
| C08G 18/30 | (2006.01) | |
| C08G 18/48 | (2006.01) | |
| C09J 175/08 | (2006.01) | |
| C08G 18/18 | (2006.01) | |
| C08G 18/77 | (2006.01) | |
| C08K 5/541 | (2006.01) | |
| C09J 175/06 | (2006.01) | |

(52) U.S. Cl.
CPC .......... C09J 175/04 (2013.01); C08G 18/165 (2013.01); C08G 18/18 (2013.01); C08G 18/2081 (2013.01); C08G 18/307 (2013.01); C08G 18/4812 (2013.01); C08G 18/7657 (2013.01); C08G 18/778 (2013.01); C08K 5/541 (2013.01); C09J 175/06 (2013.01); C09J 175/08 (2013.01)

(58) Field of Classification Search
CPC .................................................. C08G 18/307
See application file for complete search history.

(56) References Cited

U.S. PATENT DOCUMENTS

| | | | | |
|---|---|---|---|---|
| 5,290,853 | A * | 3/1994 | Regan | C08G 18/10 524/265 |
| 6,274,674 | B1 * | 8/2001 | Chang | B32B 7/12 525/129 |
| 6,657,035 | B1 | 12/2003 | Nakata et al. | |
| 7,834,123 | B2 * | 11/2010 | Suen | C08G 18/165 528/45 |
| 2003/0098114 | A1 * | 5/2003 | Samurkas | B08B 7/00 156/108 |
| 2015/0203728 | A1 | 7/2015 | Burckhardt et al. | |

FOREIGN PATENT DOCUMENTS

| | | |
|---|---|---|
| CN | 1592723 A | 3/2005 |
| CN | 101307217 A | 11/2008 |
| DE | 108103 A1 | 9/1974 |
| EP | 1857480 A1 | 11/2007 |
| EP | 2706075 A1 | 3/2014 |
| JP | 2006-502267 A | 1/2006 |
| JP | 2007-308705 A | 11/2007 |
| JP | 2013-538252 A | 10/2013 |
| WO | 01/053423 A1 | 7/2001 |
| WO | 02/48228 A2 | 6/2002 |
| WO | 03/048067 A1 | 6/2003 |
| WO | 2004/033519 A1 | 4/2004 |
| WO | 2012/010559 A1 | 1/2012 |

OTHER PUBLICATIONS

Mar. 28, 2017 International Preliminary Report on Patentability issued in International Patent Application No. PCT/EP2015/070117.
Jan. 19, 2016 International Search Report issued in International Patent Application No. PCT/EP2015/070117.
Jun. 21, 2019 Office Action Issued in Chinese Patent Application No. 201580050725.4.
Jul. 2, 2019 Office Action Issued in Japanese Patent Application No. 2017-515173.

* cited by examiner

*Primary Examiner* — Kuo Liang Peng
(74) *Attorney, Agent, or Firm* — Oliff PLC

(57) ABSTRACT

A moisture-curing adhesive composition has a) at least one polyurethane polymer having isocyanate groups, b) at least a silane adhesion promoter, c) at least one amine catalyst, and d) at least one chelate complexing agent. Compositions are suitable especially as adhesive or sealant, in particular for glass panes, for example in vehicle construction or vehicle repair, wherein the use of a primer or activator can be dispensed with.

18 Claims, No Drawings

STORAGE-STABLE, MOISTURE-CURING POLYURETHANE ADHESIVE WITH RAPID ADHESIVE FORMATION ON GLASS

TECHNICAL FIELD

The invention relates to moisture-curing compositions based on polyurethane which are suitable for bonding and sealing applications in the manufacturing industry and in vehicle construction and vehicle repair, more particularly for the adhesive bonding of glass sheets.

PRIOR ART

Polyurethane-based, moisture-curing adhesives have a long history of use in industrial manufacture, as for example for the elastic bonding and sealing of glass sheets in the production and repair of vehicles such as automobiles, trucks, trains, or boats. Particularly in the case of rapid bonding operations, where the adhesive bond must quickly be frictionally secure, because the bond will be loaded soon after the substrates are assembled, said substrates are typically pretreated, with an activator or a primer for example, in order to support the development of adhesion between substrate and adhesive. The pretreatment, though, constitutes an additional, time-consuming workstep, which incurs costs and increases the complexity and hence susceptibility to error of the bonding operation. In order to reduce costs and to increase operational reliability, therefore, there is a strong desire for adhesives which reliably and very rapidly develop effective adhesive force even to substrates which have not been pretreated by activator or primer. One simple means of enhancing the development of adhesion of an adhesive to the substrate is to admix it with an adhesion promoter which is effective on the substrate in question. For glass and screen-printed ceramic substrates, such promoters are organofunctional silanes, of the kind also contained in activators. This, however, introduces the drawback that the adhesive may lose some of its shelf life—owing to unwanted reactions of the silane with the prepolymer during the storage period, the adhesive often thickens significantly and is therefore difficult if not impossible to apply soon after. It also suffers a reduction in its mechanical strength after curing, since the silane present in the adhesive releases an alcohol on curing, and this alcohol causes chain terminations within the polyurethane. These effects are exacerbated in proportion to the extent to which the adhesive is heated during storage and curing, and in proportion with the amount of substances present in the adhesive that have a catalytic effect on the silane groups, these substances in turn ensuring rapid activity of the silane in the development of adhesion and therefore being desirable. Catalysts which are exceptionally active for the silane groups are, in particular, organotin compounds, such as dibutyltin dilaurate or dibutyltin diacetate, for example, which are often used concurrently as catalysts for the curing of the adhesive and also earlier during the preparation of the prepolymer contained in the adhesive. One-component polyurethane adhesives, which comprise not only organotin compounds but also organofunctional silanes, are particularly quick in developing strength to mineral substrates, but also have a particularly short shelf life and particularly low strength after curing. With special organofunctional silanes having a less-reactive silane group, the unwanted effects can be alleviated; accordingly, however, the development of adhesion is slowed, particularly at a temperature in the region of 23° C. or below. One-component polyurethane adhesives available to date have still not been able to meet all of the requirements in terms of shelf life, workability, and rapid development of adhesion, when used without adhesion promoters or primers. There therefore continues to be a need for such a solution.

SUMMARY OF THE INVENTION

It is an object of the present invention, therefore, to provide a moisture-curing polyurethane adhesive with a long shelf life, with rapid curing in tandem with rapid development of adhesion on mineral substrates such as glass and screen-printed ceramic, and also with high ultimate strength and ultimate elongation, this adhesive being suitable for elastic bonding and sealing of glass sheets, especially in the production or repair of vehicles, without any need for the glass sheets necessarily to be pretreated with activators or primers.

Surprisingly it has now been found that compositions as claimed in claim 1 achieve this object.

The adhesive composition of the invention has a long shelf life, meaning that even after a prolonged storage period, of several months up to a year, for example, it exhibits little change in its application properties, particularly the viscosity, and can therefore be used in the manner intended. In spite of this, it cures rapidly to form a material of high strength and stability, even at elevated application temperature. At the same time it develops, comparatively rapidly and reliably, an effective adhesion to mineral substrates such as glass or screen-printed ceramic, even if these substrates have undergone little or no pretreatment, and thus opens up the way to an economic bonding method with high operational reliability.

Another subject of the invention is a method for stabilizing a polyurethane-based, moisture-curing adhesive comprising a silane adhesion promoter and an amine catalyst by means of a chelate complexing agent. The method of the invention allows the shelf life of the adhesive—that is, the time within which the adhesive changes only slightly in its properties, particularly the viscosity, and therefore remains suitable for use in the manner intended—to be significantly prolonged, without the adhesive thereby suffering detractions in cure rate and in the development of adhesion.

Further aspects of the invention are subjects of further independent claims. Particularly preferred embodiments of the invention are subjects of the dependent claims.

CERTAIN EMBODIMENTS OF THE INVENTION

A subject of the invention is a moisture-curing adhesive composition comprising:
  a) at least one polyurethane polymer containing isocyanate groups,
  b) at least one silane adhesion promoter,
  c) at least one amine catalyst, and
  d) at least one chelate complexing agent.

Substance names beginning with "poly", such as polyol or polyisocyanate, in the present document identify substances which formally contain two or more per molecule of the functional groups that occur in their name.

The term "polymer" in the present document encompasses on the one hand a collective of chemically uniform macromolecules which nevertheless differ in respect of degree of polymerization, molar mass, and chain length, said collective having been prepared through a polymerization reaction (chain-growth addition polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically nonuniform. The term, moreover, also encompasses what are called prepolymers, these being reactive oligomeric preadducts whose functional groups have participated in the construction of macromolecules.

The term "polyurethane polymer" encompasses all polymers which are prepared by the process known as the diisocyanate polyaddition process. This also includes those polymers virtually free or entirely free from urethane groups.

Examples of polyurethane polymers are polyether-polyurethanes, polyester-polyurethanes, polyether-polyureas, polyureas, polyester-polyureas, polyisocyanurates, and polycarbodiimides.

"Molecular weight" is understood in the present document to refer to the molar mass (in grams per mole) of a molecule. "Average molecular weight" is the term for the number average $M_n$ of an oligomeric or polymeric mixture of molecules, and is customarily determined by means of gel permeation chromatography (GPC) against polystyrene as standard. "Room temperature" in the present document refers to a temperature of 23° C.

Examples of suitable polyurethane polymers containing isocyanate groups for producing a composition of the invention include polymers which are obtainable by the reaction of at least one polyol with at least one polyisocyanate, more particularly a diisocyanate. This reaction may take place by the polyol and the polyisocyanate being reacted by customary methods, as for example at temperatures of 50° C. to 100° C., optionally with accompanying use of suitable catalysts, the polyisocyanate being metered such that its isocyanate groups are present in a stoichiometric excess in relation to the hydroxyl groups of the polyol.

More particularly the excess of polyisocyanate is selected such that in the resulting polyurethane polymer, after the reaction of all hydroxyl groups of the polyol, the remaining free isocyanate group content is from 0.1 to 5 wt %, preferably 0.2 to 3 wt %, very preferably 0.3 to 2.5 wt %, based on the overall polymer.

The polyurethane polymer may optionally be prepared with accompanying use of plasticizers, in which case the plasticizers used contain no groups that are reactive toward isocyanates.

Preferred polyurethane polymers with the stated free isocyanate group content are those obtained from the reaction of diisocyanates with high molecular mass diols in an NCO:OH ratio of 1.3:1 to 4:1, more particularly 1.5:1 to 3:1, and very preferably 1.7:1 to 2.5:1.

Suitable polyols for preparing the polyurethane polymer containing isocyanate groups are, in particular, polyether polyols, styrene-acrylonitrile-grafted polyether polyols, polyester polyols, polycarbonate polyols, poly(meth)acrylate polyols, polyhydroxy-functional fats and oils, or polyhydrocarbon polyols, and also mixtures of these polyols.

Especially suitable polyether polyols, also called polyoxyalkylene polyols or oligoetherols, are those which are polymerization products of ethylene oxide, 1,2-propylene oxide, 1,2- or 2,3-butylene oxide, oxetane, tetrahydrofuran, or mixtures thereof, optionally polymerized with the aid of a starter molecule having two or more active hydrogen atoms, such as water, ammonia, for example, or compounds having two or more OH or NH groups, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the stated compounds. Use may be made both of polyoxyalkylene polyols which have a low degree of unsaturation (measured by ASTM D-2849-69 and expressed in milliequivalents of unsaturation per gram of polyol (meq/g)), prepared for example by means of double metal cyanide complex catalysts (DMC catalysts), and of polyoxyalkylene polyols having a higher degree of unsaturation, prepared for example by means of anionic catalysts such as NaOH, KOH, CsOH, or alkali metal alkoxides.

Particularly suitable are polyoxyethylene polyols and polyoxypropylene polyols, especially polyoxyethylene diols, polyoxypropylene diols, polyoxyethylene triols, and polyoxypropylene triols.

Especially suitable are polyoxyalkylene diols or polyoxyalkylene triols having a degree of unsaturation of less than 0.02 meq/g and having a molecular weight in the range from 1000 to 30 000 g/mol, and also polyoxyethylene diols, polyoxyethylene triols, polyoxypropylene diols, and polyoxypropylene triols having a molecular weight of 400 to 20 000 g/mol.

Likewise particularly suitable are so-called ethylene oxide-terminated ("EO-endcapped", ethylene oxide-endcapped) polyoxypropylene polyols. The latter are special polyoxypropylene-polyoxyethylene polyols which are obtained, for example, by subjecting pure polyoxypropylene polyols, especially polyoxypropylene diols and triols, to further alkoxylation with ethylene oxide after the end of the polypropoxylation reaction, and which therefore have primary hydroxyl groups. Preferred in this case are polyoxypropylene-polyoxyethylene diols and polyoxypropylene-polyoxyethylene triols.

Especially suitable as polyester polyols are polyesters which carry at least two hydroxyl groups and are prepared by known processes, particularly by the polycondensation of hydroxycarboxylic acids or the polycondensation of aliphatic and/or aromatic polycarboxylic acids with dihydric or polyhydric alcohols.

Especially suitable are polyester polyols prepared from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane, or mixtures of the aforementioned alcohols, with organic dicarboxylic acids or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride, or mixtures of the aforesaid acids, and also polyester polyols of lactones such as ε-caprolactone, for example.

Particularly suitable are polyester diols, especially those prepared from adipic acid, azelaic acid, sebacic acid, dodecanedicarboxylic acid, dimer fatty acid, phthalic acid, isophthalic acid, and terephthalic acid as dicarboxylic acid or from lactones such as, for example, ε-caprolactone and from ethylene glycol, diethylene glycol, neopentyl glycol, 1,4-butanediol, 1,6-hexanediol, dimer fatty acid diol, and 1,4-cyclohexanedimethanol as dihydric alcohol.

Especially suitable polycarbonate polyols are those of the kind obtainable by reaction, for example, of the aforementioned alcohols, those used for synthesizing the polyester polyols, with dialkyl carbonates such as dimethyl carbonate, diaryl carbonates such as diphenyl carbonate, or phosgene. Particularly suitable are polycarbonate diols, especially amorphous polycarbonate diols.

Other suitable polyols are poly(meth)acrylate polyols.

Likewise suitable are polyhydroxy-functional fats and oils, examples being natural fats and oils, especially castor oil, or so-called oleochemical polyols, obtained by chemical modification of natural fats and oils, or the epoxy polyesters or epoxy polyethers obtained, for example, by epoxidation of unsaturated oils and subsequent ring opening with carboxylic acids or alcohols, respectively, or polyols obtained by hydroformylation and hydrogenation of unsaturated oils.

Additionally suitable are polyols which are obtained from natural fats and oils by degradation processes such as alcoholysis or ozonolysis and subsequent chemical linkage, such as by transesterification or dimerization, of the resultant degradation products or derivatives thereof. Particularly suitable degradation products of natural fats and oils are fatty acids and fatty alcohols and also fatty acid esters, more particularly the methyl esters (FAME), which may be derivatized, for example, by hydroformylation and hydrogenation to form hydroxy-fatty acid esters.

Likewise suitable, moreover, are polyhydrocarbon polyols, also called oligohydrocarbonols, examples being polyhydroxy-functional ethylene-propylene, ethylene-butylene or ethylene-propylene-diene copolymers, as manufactured by Kraton Polymers, USA, for example, or polyhydroxy-functional copolymers of dienes such as 1,3-butadiene or diene mixtures and vinyl monomers such as styrene, acrylonitrile or isobutylene, or polyhydroxy-functional polybutadiene polyols, examples being those prepared by oxidation of polybutadiene or copolymerization of 1,3-butadiene and allyl alcohol, and which may also have been hydrogenated.

Additionally suitable are polyhydroxy-functional acrylonitrile/butadiene copolymers, of the kind preparable, for example, from epoxides or amino alcohols and from carboxyl-terminated acrylonitrile/butadiene copolymers which are available commercially under the name Hypro® CTBN from Emerald Performance Materials, LLC, USA.

These stated polyols preferably have an average molecular weight of 250 to 30 000 g/mol, more particularly of 1000 to 20 000 g/mol, and an average OH functionality in the range from 1.6 to 3.

Particularly suitable polyols are polyether polyols, especially polyoxyethylene polyol, polyoxypropylene polyol, and polyoxypropylene-polyoxyethylene polyol, preferably polyoxyethylene diol, polyoxypropylene diol, polyoxyethylene triol, polyoxypropylene trial, polyoxypropylene-polyoxyethylene diol, and polyoxypropylene-polyoxyethylene trial.

Further to these stated polyols it is possible to use small amounts of low molecular mass dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher alcohols, low molecular mass alkoxylation products of the aforesaid dihydric and polyhydric alcohols, and also mixtures of the aforesaid alcohols, when preparing the polyurethane polymer having terminal isocyanate groups.

As polyisocyanates for preparing the polyurethane polymer it is possible to use commercially customary polyisocyanates, especially diisocyanates.

Suitable diisocyanates by way of example are 1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanate-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-Isocyanate-1-methylethyl)naphthalene, 2,4- and 2,6-tolylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), oligomers and polymers of the aforesaid isocyanates, and also any desired mixtures of the aforesaid isocyanates, particular preference being given to MDI, especially to the 4,4'-MDI isomer.

In the composition of the invention the polyurethane polymer containing isocyanate groups is present preferably in an amount of 10 wt % to 70 wt %, more particularly in an amount of 15 wt % to 60 wt %, very preferably 20 wt % to 50 wt %, based on the overall composition.

The composition of the invention further comprises at least one silane adhesion promoter. These are individual or mixed organoalkoxysilanes which possess at least one non-hydrolyzable organic radical on the silicon atom, this radical preferably containing heteroatoms which are able—by way of free electron pairs, covalent, ionic or other mechanisms—to develop interaction with a substrate and thus to develop adhesion to that substrate. "Nonhydrolyzable" in this context means a silicon-carbon bond, in contrast, for example, to a hydrolyzable silicon-oxygen bond. In the case of bond substrates containing silicon oxide, such as glasses, the silane group of the organoalkoxysilane may also, through a hydrolysis/condensation reaction, mediate covalent adhesion to the substrate, while the organic radical reacts with the adhesive composition, by way, for example, of reaction of any hydroxyl or amine group present with an isocyanate group of a polyurethane polymer.

Suitable silane adhesion promoters are organoalkoxysilanes ("silanes"), which carry a reactive group on the organic radical, more particularly epoxysilanes, mercaptosilanes, (meth)acrylosilanes, isocyanatosilanes, anhydridosilanes, S-(alkylcarbonyl)mercaptosilanes, aldiminosilanes, or oligomeric forms of these silanes, or adducts of amino- or mercaptosilanes with polyisocyanates.

Preferred are 3-glycidyloxypropyltrimethoxysilane, β-(3,4-epoxycyclohexyl)ethyltrimethoxysilane, 3-mercaptopropyltrimethoxysilane, or 3-methacryloyloxypropyltrimethoxysilane. The most preferred is 3-glycidyloxypropyltrimethoxysilane.

The amount of silane adhesion promoter in the composition is preferably in the range from 0.01 wt % to 1.0 wt %, more particularly 0.05 wt % to 0.5 wt %, based on the overall composition.

The use of a silane adhesion promoter in accordance with the invention affords the advantage that the development of adhesion to the substrate by the adhesive is improved without any need for the substrate to be pretreated with primer or activator beforehand. This is especially advantageous in the context of glass and screen-printed ceramic substrates.

The composition of the invention further comprises at least one amine catalyst.

Suitable amine catalysts are tertiary amines, especially those having a low pKa, preferably a pKa of between 12 and 7. Examples of suitable amine catalysts are N-ethyldiisopropylamine, N,N,N',N'-tetramethylalkylenediamines, 1,4-diazabicyclo[2.2.2]octane, and also, preferably, 2,2'-dimorpholinodiethyl ether (DMDEE), and also derivatives thereof with substituents on the morpholine rings. Particularly preferred is DMDEE.

With preference the composition of the invention contains insubstantial quantities, or none, of acids, since acids substantially inhibit the activity of the amine catalyst through neutralization reactions with said catalyst. Insubstantial amounts of acids are those which make up not more than 10 mol %, based on the amine catalyst.

The amount of amine catalyst in the composition is preferably in the range from 0.05 wt % to 1.0 wt %, more particularly 0.1 wt % to 0.8 wt %, very preferably 0.15 wt % to 0.6 wt %, based on the overall composition.

The composition of the invention further comprises at least one chelate complexing agent. A "chelate complexing agent" in the sense of the invention is an organic compound free from ionic bonds that is able, together with a metal cation, to form a metal complex compound, in which the chelate complexing agent in singly or multiply deprotonated form represents a bidentate or multidentate ligand. The metal cations which can be complexed by the chelate complexing agent may already be present in the raw materials of the composition (for example, from the synthesis of the isocyanate group-containing polyurethane polymers referred to earlier on above), or they come, for example, from any subsequently added metal catalysts (see further below).

Particularly suitable as chelate complexing agents are compounds from the class of the 1,3-diketones, 1,3-ketoesters, 1,3-ketoamides, and 8-hydroxyquinolines.

Preferred as chelate complexing agents are 8-hydroxyquinoline or derivatives thereof with alkyl substituents on the aromatic carbon atoms, acetylacetone, dibenzoylmethane, ethylacetoacetate, or N,N-diethylacetoacetamide.

Particularly preferred chelate complexing agents are those which comprise at least one aromatic ring.

Particularly preferred is 8-hydroxyquinoline.

Further particularly preferred is dibenzoylmethane.

The amount of chelate complexing agent in the composition is preferably in the range from 0.01 wt % to 0.5 wt %, more particularly 0.02 wt % to 0.2 wt %, very preferably 0.03 wt % to 0.1 wt %, based on the overall composition.

The use of the chelate complexing agent in accordance with the invention affords the advantage in particular that the storage stability of the adhesive containing silane adhesion promoter is increased. The chelate complexing agent inhibits unwanted reactions The amount of amine catalyst in the composition is preferably in the range from 0.05 wt % to 1.0 wt %, more particularly 0.1 wt % to 0.8 wt %, very preferably 0.15 wt % to 0.6 wt %, based on the overall composition.

The composition of the invention further comprises at least one chelate complexing agent. A "chelate complexing agent" in the sense of the invention is an organic compound free from ionic bonds that is able, together with a metal cation, to form a metal complex compound, in which the chelate complexing agent in singly or multiply deprotonated form represents a bidentate or multidentate ligand. The metal cations which can be complexed by the chelate complexing agent may already be present in the raw materials of the composition (for example, from the synthesis of the isocyanate group-containing polyurethane polymers referred to earlier on above), or they come, for example, from any subsequently added metal catalysts (see further below).

Particularly suitable as chelate complexing agents are compounds from the class of the 1,3-diketones, 1,3-ketoesters, 1,3-ketoamides, and 8-hydroxyquinolines.

Preferred as chelate complexing agents are 8-hydroxyquinoline or derivatives thereof with alkyl substituents on the aromatic carbon atoms, acetylacetone, dibenzoylmethane, ethylacetoacetate, or N,N-diethylacetoacetamide.

Particularly preferred is 8-hydroxyquinoline.

The amount of chelate complexing agent in the composition is preferably in the range from 0.01 wt % to 0.5 wt %, more particularly 0.02 wt % to 0.2 wt %, very preferably 0.03 wt % to 0.1 wt %, based on the overall composition.

The use of the chelate complexing agent in accordance with the invention affords the advantage in particular that the storage stability of the adhesive containing silane adhesion promoter is increased. The chelate complexing agent inhibits unwanted reactions of the silane with the prepolymer during the storage period; without chelate complexing agent, the adhesive would thicken significantly during the storage period and therefore would soon become difficult if not impossible to apply. Moreover, in the silane adhesion promoter-containing adhesive without chelate complexing agent, there is also a reduction in its mechanical strength after curing, since the silane present in the adhesive releases an alcohol in the course of curing, and this alcohol leads to chain terminations in the polyurethane.

The composition described preferably comprises at least one metal catalyst.

This catalyst may either be added additionally, or may already be present in the raw materials of the composition—for example, from the synthesis of a polyurethane polymer containing isocyanate groups. Preferred as metal catalyst are organotin(IV) compounds, organotitanates or organozirconates.

Particularly preferred are organotin(IV) compounds. Suitability as organotin(IV) compound is possessed in particular by dialkyltin oxides, dialkyltin dichlorides, dialkyltin dicarboxylates, and dialkyltin diketonates, preferably dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate, or dioctyltin diacetylacetonate.

The amount of metal catalyst in the composition is preferably in the range from 0.001 wt % to 1.0 wt %, more particularly 0.005 wt % to 0.1 wt %, based on the overall composition.

The amount of any organotin(IV) compound used in the composition is preferably in the range from 0.001 wt % to 0.2 wt %, more particularly 0.005 wt % to 0.1 wt %, based on the overall composition.

The molar ratio between chelate complexing agent and metal catalyst is preferably in the range from 2 to 6, more particularly from 2 to 4.

The composition described preferably comprises further ingredients customary for polyurethane adhesives, especially fillers, plasticizers, rheological additives, adhesion promoters, drying agents or stabilizers with respect to UV light and oxidation, and also further common adjuvants of these kinds.

In particular the composition comprises at least one filler. Suitability as filler is possessed in particular by natural, ground or precipitated chalks (which consist entirely or primarily of calcium carbonate), which are optionally coated with fatty acids, more particularly stearates; barium sulfate ($BaSO_4$, also called barite or heavy spar); calcined kaolins; aluminum oxides; aluminum hydroxides; silicas, more particularly finely divided silicas from pyrolysis processes; carbon blacks, especially industrially produced carbon black; PVC powders; or hollow beads. Preferred fillers are calcium carbonates, calcined kaolins, carbon black, finely divided silicas, and flame-retardant fillers, such as hydroxides or hydrates, especially hydroxides or hydrates of aluminum, preferably aluminum hydroxide.

It is entirely possible and may even be of advantage to use a mixture of different fillers. Particularly preferred fillers are ground calcium carbonates, calcined kaolins, or carbon black. Most preferred are combinations of ground calcium carbonates or calcined kaolins and carbon black.

The amount of filler in the composition is preferably in the range from 10 wt % to 70 wt %, more particularly 20 wt % to 60 wt %, very preferably 30 wt % to 50 wt %, based on the overall composition.

The composition in particular comprises at least one plasticizer. Especially suitable as plasticizers are esters of organic carboxylic acids, more particularly phthalates such as diisononyl phthalate or diisodecyl phthalate, hydrogenated phthalates such as diisononyl 1,2-cyclohexanedicarboxylate, adipates such as dioctyl adipate, azelates and sebacates, or esters of organic phosphoric and sulfonic acids, or hydrocarbons such as polybutenes or polyisobutenes. Preferred plasticizers are phthalates, hydrogenated phthalates or adipates. Most preferred are diisononyl phthalate, diisodecyl phthalate or diisononyl 1,2-cyclohexanedicarboxylate.

The amount of plasticizer in the composition is preferably in the range from 5 wt % to 40 wt %, more particularly 10 wt % to 30 wt %, very preferably 15 wt % to 25 wt %, based on the overall composition.

Furthermore, as mentioned above, the composition of the invention may additionally comprise other ingredients customary for polyurethane adhesives.

Such ingredients are, by way of example:

crosslinkers, such as, for example, oligomers and derivatives of diisocyanates such as MDI, TDI, HDI or IPDI, especially isocyanurates, carbodiimides, uretonimides, biurets, allophanates, and iminooxadiazinediones, or mixtures of MDI and MDI homologs (polymeric MDI or PMDI);

drying agents, such as, for example, p-tosyl isocyanate and other reactive isocyanates, calcium oxide, or molecular sieves;

rheological modifiers such as, for example, thickeners, examples being urea compounds of the kind described as thixotroping agents ("thixotropy endowning agent") in WO 02/48228 A2 on pages 9 to 11, polyamide waxes, bentonites, or fumed silicas;

stabilizers against heat, light and UV radiation; flame retardants;

surface-active substances such as, for example, wetting agents, flow control agents, deaerating agents or defoamers;

biocides such as, for example, algicides or fungicides;

and also further substances customarily used in one-component isocyanate-containing compositions, such as, for example, fibers, as for example of polyethylene; dyes, pigments, or other adjuvants known to the person skilled in the art.

In one particularly preferred embodiment, the composition of the invention comprises:
a) 20 wt % to 50 wt % of at least one isocyanate-functional polymer,
b) 0.05 wt % to 0.5 wt % of at least one silane adhesion promoter, preferably 3-glycidyloxypropyltrimethoxysilane,
c) 0.15 wt % to 0.6 wt % of at least one amine catalyst, preferably DMDEE,
d) 0.005 wt % to 0.1 wt % of at least one organotin(IV) compound,
e) 0.03 wt % to 0.1 wt % of at least one chelate complexing agent, preferably 8-hydroxyquinoline or dibenzoylmethane,
f) 30 wt % to 50 wt % of at least one filler, and
g) 15 wt % to 25 wt % of at least one plasticizer, based on the overall composition.

A composition of this kind is suitable, for example, as an adhesive for bonding and sealing glass or screen-printed ceramics, in the context, for example, of vehicle construction or vehicle repair in the bonding of glass sheets.

Under the influence of moisture, optionally accelerated by heating, the composition of the invention cures rapidly, with crosslinking of the isocyanate-functional polymers and any crosslinkers and/or latent ones present. The moisture that is needed for curing may come from the air (atmospheric moisture), in which case the composition cures from the outside inward through the diffusion of the moisture. The composition may alternatively be contacted with a water-containing component, this contact being brought about, for example, by spreading, using a smoothing means, for example, or by spraying, or by immersion processes, or the composition may be admixed with a water-containing component, for example of polyethylene; dyes, pigments, or other adjuvants known to the person skilled in the art.

In one particularly preferred embodiment, the composition of the invention comprises:
a) 20 wt % to 50 wt % of at least one isocyanate-functional polymer,
b) 0.05 wt % to 0.5 wt % of at least one silane adhesion promoter, preferably 3-glycidyloxypropyltrimethoxysilane,
c) 0.15 wt % to 0.6 wt % of at least one amine catalyst, preferably DMDEE,
d) 0.005 wt % to 0.1 wt % of at least one organotin(IV) compound,
e) 0.03 wt % to 0.1 wt % of at least one chelate complexing agent, preferably 8-hydroxyquinoline,
f) 30 wt % to 50 wt % of at least one filler, and
g) 15 wt % to 25 wt % of at least one plasticizer, based on the overall composition.

A composition of this kind is suitable, for example, as an adhesive for bonding and sealing glass or screen-printed ceramics, in the context, for example, of vehicle construction or vehicle repair in the bonding of glass sheets.

Under the influence of moisture, optionally accelerated by heating, the composition of the invention cures rapidly, with crosslinking of the isocyanate-functional polymers and any crosslinkers and/or latent ones present. The moisture that is needed for curing may come from the air (atmospheric moisture), in which case the composition cures from the outside inward through the diffusion of the moisture. The composition may alternatively be contacted with a water-containing component, this contact being brought about, for example, by spreading, using a smoothing means, for example, or by spraying, or by immersion processes, or the composition may be admixed with a water-containing component, in the form, for example, of a water-containing paste, which is mixed homogeneously or heterogeneously with the composition using a static mixer, for example.

The composition of the invention possesses a long shelf life, meaning that it is storage-stable for a relatively long time. A composition is referred to as "storage-stable" or "storable" if it can be kept at room temperature in a suitable container for a relatively long time, typically at least 3 months up to 6 months or more, without suffering any change in its application or usage properties, particularly the viscosity, the required extrusion force on application from the container, and the crosslinking rate, to an extent relevant for its usage, as the result of the storage process. This means, for example, that for the composition of the invention, the extrusion force, measured by the method described below at 23° C., after storage at 60° C. for 14 d (which produces accelerated aging), increases preferably by a factor of not more than 3, more preferably not more than 2.5, more particularly not more than 2, in comparison to the extrusion force of a freshly prepared composition stored at 23° C. for 7 d.

The present invention further encompasses the use of an above-described composition as a moisture-curing adhesive or sealant. The composition of the invention is suitable especially for application to concrete, mortar, brick, tile, plaster, a natural stone such as granite or marble, glass, glass-ceramic, screen-printed ceramic, a metal or a metal alloy, wood, a plastic, or a painted material.

The composition is used preferably as adhesive, for glass, glass-ceramic or screen-printed ceramic, for example.

The composition of the invention preferably has a paste-like consistency with properties of structural viscosity. A composition of this kind is applied to the substrate by means of a suitable apparatus, as for in the form, for example, of a water-containing paste, which is mixed homogeneously or heterogeneously with the composition using a static mixer, for example.

The composition of the invention possesses a long shelf life, meaning that it is storage-stable for a relatively long time. A composition is referred to as "storage-stable" or "storable" if it can be kept at room temperature in a suitable container for a relatively long time, typically at least 3 months up to 6 months or more, without suffering any change in its application or usage properties, particularly the viscosity, the required extrusion force on application from the container, and the crosslinking rate, to an extent relevant for its usage, as the result of the storage process. This means, for example, that for the composition of the invention, the extrusion force, measured by the method described below at 23° C., after storage at 60° C. for 14 d (which produces accelerated aging), increases by less than 75%, preferably less than 50%, in comparison to the extrusion force of a freshly prepared composition stored at 23° C. for 7 d.

The present invention further encompasses the use of an above-described composition as a moisture-curing adhesive or sealant. The composition of the invention is suitable especially for application to concrete, mortar, brick, tile, plaster, a natural stone such as granite or marble, glass, glass-ceramic, screen-printed ceramic, a metal or a metal alloy, wood, a plastic, or a painted material.

The composition is used preferably as adhesive, for glass, glass-ceramic or screen-printed ceramic, for example.

The composition of the invention preferably has a paste-like consistency with properties of structural viscosity. A composition of this kind is applied to the substrate by means of a suitable apparatus, as for example from a cartridge or by means of a toothed applicator from a larger container. A composition of the invention having good applications properties preferably has high sag resistance and short straining and also low viscosity or extrusion force. This means it can be spread with the toothed applicator with little force, or extruded, remains in the applied form after application, thus does not run apart, and, after the application device has been put down, forms no string or only a very short string, so that the substrate is not fouled.

In particular, the composition of the invention has a low extrusion force as measured by the method described in more detail below (see Examples), after conditioning at 60° C. for 14 d. In one preferred embodiment the extrusion force measured is ≤1500 N; in a most-preferred embodiment it is ≤1250 N.

The composition of the invention is applied in particular in a temperature range between 5° C. and 45° C., preferably in the region of room temperature, and also cures under these conditions. Optionally it is heated prior to application, to a temperature, for example, in the range from 20° C. to 100° C., especially 40° C. to 80° C., by means of a cartridge oven, for example.

The invention further relates to a method for stabilizing a moisture-curing adhesive composition based on polyurethane, comprising a silane adhesion promoter and an amine catalyst, characterized in that the adhesive composition is admixed with a chelate complexing agent, preferably with a fraction of 0.01 wt % to 0.5 wt %, more particularly 0.02 wt % to 0.2 wt %, very preferably 0.03 wt % to 0.1 wt %, based on the overall composition. The effect of admixing a chelate complexing agent to a composition of this kind is to improve the storage stability, but without adversely affecting significantly the mechanical properties of the composition after curing or the adhesion properties. Possible as a result is a one-component formulation which can be used with little activator or primer or none at all. The chelate complexing agent is admixed preferably during the actual formulation of the composition, but may also be admixed later, such as only at the dispensing stage, for example. It is necessary, though, to ensure that in the absence of the chelate complexing agent, the storage stability is not ensured to the extent according to the invention.

The invention further relates to a cured composition obtainable from a composition as described above after curing thereof with water, particularly in the form of atmospheric moisture.

The articles bonded and/or sealed with a composition of the invention comprise, in particular, an edifice, more particularly an edifice in structural or civil engineering, an industrially manufactured product or a consumer product, more particularly a window, a household appliance, or a means of transport or ancillary component of a means of transport, more particularly a glass sheet.

EXAMPLES

Set out below are working examples which are intended to elucidate in more detail the invention described. The invention is of course not confined to these working examples described.

Description of Measurement Methods

The tensile strength and the elongation at break were determined according to DIN EN ISO 527 (tensioning rate: 200 mm/min) on films with a layer thickness of 2 mm that have been cured for 14 days (d) at 23° C. (room temperature, "RT") and 50% relative humidity.

For the determination of the extrusion force the compositions were dispensed into internally coated aluminum cartridges (outer diameter 46.9 mm, inner diameter 46.2 mm, length 215 mm, metric ISO thread M15×1.5 mm) and given an airtight seal with a polyethylene stopper (diameter 46.1 mm) from Novelis Germany GmbH. After conditioning at 23° C. for 24 hours, the cartridges were opened and the contents extruded using an extrusion device. For this purpose, a nozzle with a 5 mm inside-diameter opening was screwed onto the cartridge thread. Using an extrusion device (Zwick/Roell Z005), a determination was made of the force needed to extrude the composition at an extrusion rate of 60 mm/min. The figure reported is an average value of the forces measured after an extrusion distance of 22 mm, 24 mm, 26 mm, and 28 mm. After an extrusion distance of 30 mm, measurement was halted.

Further measurement series were conducted after identical cartridges had been stored at 60° C. for 7, 14, and 21 days in each case and thereafter cooled to room temperature. These extrusion force measurements were carried out subsequently in the same procedure as for the first measurement series.

These further measurement series were used to estimate the storage stability of the compositions.

For the determination of the adhesion, beads of adhesive of the compositions produced were applied to the corresponding substrates, exposed to different storage conditions, and thereafter tested at room temperature (23° C.) and 50% relative humidity by means of the "bead test". This test involves incising the bead at the end just above the bond area. The incised end of the bead is held with rounded-end tweezers and pulled from the substrate. This is done by carefully rolling up the bead onto the tip of the tweezers, and placing a cut at right angles to the direction of bead pulling, down to the bare substrate. The bead pulling rate should be selected such that a cut has to be made approximately every 3 seconds. The test distance must be at least 8 cm. After the bead has been pulled off, adhesive remaining on the substrate is assessed (cohesive fracture). The adhesion properties are evaluated by estimation of the cohesive component of the adhesive surface (greater cohesive component denotes better adhesion):

1=>95% cohesive fracture
2=75-95% cohesive fracture
3=25-75% cohesive fracture
4=<25% cohesive fracture
5=0% cohesive fracture (purely adhesive fracture)

The storage conditions for the adhesion experiments were 7 days at 23° C. and 50% relative humidity ("7 d RT" in Table 3); or 7 days at 23° C. and 50% relative humidity, followed by 7 days immersed in water at room temperature ("+7 d H$_2$O" in Table 3); or 7 days at 23° C. and 50% relative humidity, followed by 7 days immersed in water at room temperature, followed by 7 d at 70° C. and 100% relative humidity ("+7 d 70/100" in Table 3).

Substrates (adhesion bases) used for the adhesion experiments described above were the following glass or ceramic-coated glass materials: automotive window glass with ceramic coating, type Ferro 3402 ("Ferro 3402"), with ceramic coating, type Ferro 14251 ("Ferro 14251") and with ceramic coating, type Ferro 14279 ("Ferro 14278"), and also float glass, bonded on the air side ("glass air"), and float glass, bonded on the tin side ("glass tin"). All of these adhesion bases are available from Rocholl GmbH, Germany.

Preparation of Isocyanate Group-containing Polyurethane Polymer P-1

1300 g of polyoxypropylene diol (Acclaim® 4200 N, Bayer MaterialScience AG, Germany; OH number 28.5 mg KOH/g), 2600 g of polyoxypropylene-polyoxyethylene triol (Caradol® MD34-02, Shell Chemicals Ltd., UK; OH number 35.0 mg KOH/g), 600 g of 4,4'-methylenediphenyl diisocyanate (4,4'-MDI; Desmodur® 44 MC L, Bayer MaterialScience AG, Germany), and 500 g of diisodecyl phthalate (DIDP; Palatinol® Z, BASF SE, Germany) were reacted by a known method at 80° C. to form an NCO-terminated polyurethane polymer having a free isocyanate group content of 2.05 wt %.

Production of Compositions Z1 to Z4 and Ref-1 and Ref-2

In a vacuum mixer, the ingredients specified in Table 1, in the amounts specified and in the order specified, were added and mixed and the mixture, lastly, was processed to a homogeneous paste under reduced pressure at 1000-1200 revolutions for 20 minutes. This paste was then dispensed into internally coated aluminum gun-application cartridges.

The compositions Z1 to Z4 are inventive examples. Ref-1 and Ref-2 are comparative examples.

TABLE 1

Composition (in parts by weight) of inventive compositions Z1 to Z4 and of reference compositions Ref-1 and Ref-2

| Ingredient | Z1 | Z2 | Z3 | Z4 | Ref-1 | Ref-2 |
|---|---|---|---|---|---|---|
| Polymer P-1 | 43.0 | 43.0 | 43.0 | 43.0 | 43.0 | 43.0 |
| DIDP [1] | 19.8 | 19.5 | 19.8 | 19.8 | 20.3 | 20.5 |
| 8-Hydroxyquinoline [2] 10 wt % in DIDP | 0.5 | — | — | — | — | — |
| Dibenzoyl methane [2] 10 wt % in DIDP | — | 0.8 | — | — | — | — |
| Ethyl acetoacetate [2] 10 wt % in DIDP | — | — | 0.5 | — | — | — |
| N,N-Diethyl-3-oxobutanamide [2] 10 wt % in DIDP | — | — | — | 0.5 | — | — |
| Silquest A-187 [3] | 0.3 | 0.3 | 0.3 | 0.3 | 0.3 | 0.3 |
| Carbon black | 15.0 | 15.0 | 15.0 | 15.0 | 15.0 | 15.0 |
| Calcined kaolin | 20.0 | 20.0 | 20.0 | 20.0 | 20.0 | 20.0 |
| Silica [4] | 1.0 | 1.0 | 1.0 | 1.0 | 1.0 | 1.0 |
| DMDEE [5] | 0.1 | 0.1 | 0.1 | 0.1 | 0.1 | 0.2 |
| Dibutyltin diacetate [6] 10 wt % in DIDP | 0.3 | 0.3 | 0.3 | 0.3 | 0.3 | — |
| TOTAL | 100 | 100 | 100 | 100 | 100 | 100 |

[1] Diisodecyl phthalate (DIDP), Palatinol ® Z, BASF SE, Germany
[2] Sigma-Aldrich Chemie GmbH, Switzerland
[3] 3-Glycidyloxypropyltrimethoxysilane (Momentive Performance Materials AG, Germany)
[4] Aerosil ® R972, Evonik Industries AG, Germany
[5] 2,2'-Dimorpholinodiethyl ether (DMDEE) (Lupragen ® N106, BASF SE, Germany)
[6] BNT-CAT 400, BNT Chemicals GmbH, Germany

TABLE 2

Test results for inventive compositions Z1 to Z4 and of reference compositions Ref-1 and Ref-2 according to the measurement methods described earlier on above.

| Measurement parameter | Z1 | Z2 | Z3 | Z4 | Ref-1 | Ref-2 |
|---|---|---|---|---|---|---|
| Tensile strength [MPa] | 10.0 | 8.3 | 8.5 | 7.8 | 7.4 | 9.6 |
| Elongation at break [%] | 360 | 410 | 420 | 400 | 360 | 340 |
| Extrusion force 7 d RT [N] | 540 | 526 | 551 | 529 | 516 | 523 |
| Extrusion force 7 d 60° C. [N] | 681 | 696 | 842 | 823 | 1011 | 668 |
| Extrusion force 14 d 60° C. [N] | 935 | 1037 | 1585 | 1320 | n.m. | 827 |
| Extrusion force 21 d 60° C. [N] | 1046 | 1266 | 2303 | 1964 | n.m. | 863 |

"n.m." stands for "not measurable" (not extrudable)

TABLE 3

Results of adhesion experiments on different substrates under different conditions for inventive compositions Z1 to Z4 and for reference compositions Ref-1 and Ref-2.

| Substrate | Conditions | Z1 | Z2 | Z3 | Z4 | Ref-1 | Ref-2 |
|---|---|---|---|---|---|---|---|
| Ferro 3402 | 7 d RT | 5 | 4 | 5 | 5 | 4 | 5 |
|  | +7 d H$_2$O | 4 | 5 | 5 | 5 | 4 | 5 |
|  | +7 d 70/100 | 1 | 1 | 1 | 4 | 1 | 2 |
| Ferro 14251 | 7 d RT | 3 | 1 | 4 | 1 | 1 | 5 |
|  | +7 d H$_2$O | 1 | 1 | 1 | 1 | 1 | 4 |
|  | +7 d 70/100 | 1 | 1 | 1 | 1 | 1 | 1 |
| Ferro 14279 | 7 d RT | 4 | 1 | 1 | 1 | 1 | 5 |
|  | +7 d H$_2$O | 1 | 1 | 1 | 1 | 1 | 1 |
|  | +7 d 70/100 | 1 | 1 | 1 | 1 | 1 | 1 |
| Glass air | 7 d RT | 1 | 1 | 1 | 1 | 1 | 1 |
|  | +7 d H$_2$O | 1 | 1 | 1 | 1 | 1 | 1 |
|  | +7 d 70/100 | 1 | 1 | 1 | 1 | 1 | 1 |
| Glass tin | 7 d RT | 2 | 1 | 3 | 3 | 2 | 5 |
|  | +7 d H$_2$O | 1 | 1 | 1 | 1 | 1 | 1 |
|  | +7 d 70/100 | 1 | 1 | 1 | 1 | 1 | 1 |

EXAMPLES

Set out below are working examples which are intended to elucidate in more detail the invention described. The invention is of course not confined to these working examples described.

Description of Measurement Methods

The tensile strength, the elongation at break, and the elasticity modulus were determined according to DIN EN ISO 527 (tensioning rate: 200 mm/min) on films with a layer thickness of 2 mm that have been cured for 14 days (d) at 23° C. (room temperature, "RT") and 50% relative humidity.

The shear modulus (G modulus) was determined according to DIN 53283.

For the determination of the extrusion force the compositions were dispensed into internally coated aluminum cartridges (outer diameter 46.9 mm, inner diameter 46.2 mm, length 215 mm, metric ISO thread M15×1.5 mm) and given an airtight seal with a polyethylene stopper (diameter 46.1 mm) from Novelis Germany GmbH. After conditioning at 23° C. for 24 hours, the cartridges were opened and the contents extruded using an extrusion device. For this purpose, a nozzle with a 5 mm inside-diameter opening was screwed onto the cartridge thread. Using an extrusion device (Zwick/Roell Z005), a determination was made of the force needed to extrude the composition at an extrusion rate of 60 mm/min. The figure reported is an average value of the forces measured after an extrusion distance of 22 mm, 24 mm, 26 mm, and 28 mm. After an extrusion distance of 30 mm, measurement was halted.

Further measurement series were conducted after identical cartridges had been stored at 60° C. for 7, 14, and 21 days in each case and thereafter cooled to room temperature. These extrusion force measurements were carried out subsequently in the same procedure as for the first measurement series.

These further measurement series were used to estimate the storage stability of the compositions.

For the determination of the adhesion, beads of adhesive of the compositions produced were applied to the corresponding substrates, exposed to different storage conditions, and thereafter tested at room temperature (23° C.) and 50% relative humidity by means of the "bead test". This test involves incising the bead at the end just above the bond area. The incised end of the bead is held with rounded-end tweezers and pulled from the substrate. This is done by carefully rolling up the bead onto the tip of the tweezers, and placing a cut at right angles to the direction of bead pulling, down to the bare substrate. The bead pulling rate should be selected such that a cut has to be made approximately every 3 seconds. The test distance must be at least 8 cm. After the bead has been pulled off, adhesive remaining on the substrate is assessed (cohesive fracture). The adhesion properties are evaluated by estimation of the cohesive component of the adhesive surface (greater cohesive component denotes better adhesion):

1=>95% cohesive fracture
2=75-95% cohesive fracture
3=25-75% cohesive fracture
4=<25% cohesive fracture
5=0% cohesive fracture (purely adhesive fracture)

The storage conditions for the adhesion experiments were 7 days at 23° C. and 50% relative humidity (for adhesion in Table 3: first number), additionally thereto 14 days at 23° C. and 50% relative humidity (second number) and additionally thereto 1 day at 80° C. and 50% relative humidity (third number).

Substrates (adhesion bases) used for the adhesion experiments described above were the following glass or ceramic-coated glass materials: automotive window glass with ceramic coating, type Ferro 3402 ("Ferro 3402"), with ceramic coating, type Ferro 14251 ("Ferro 14251") and with ceramic coating, type Ferro 14279 ("Ferro 14278"), and also float glass, bonded on the air side ("glass air"), and float glass, bonded on the tin side ("glass tin"). All of these adhesion bases are available from Rocholl GmbH, Germany.

Preparation of Isocyanate Group-containing Polyurethane Polymer P-1

1300 g of polyoxypropylene diol (Acclaim® 4200 N, Bayer MaterialScience AG, Germany; OH number 28.5 mg KOH/g), 2600 g of polyoxypropylene-polyoxyethylene triol (Caradol® MD34-02, Shell Chemicals Ltd., UK; OH number 35.0 mg KOH/g), 600 g of 4,4'-methylenediphenyl diisocyanate (4,4'-MDI; Desmodur® 44 MC L, Bayer MaterialScience AG, Germany), and 500 g of diisodecyl phthalate (DIDP; Palatinol® Z, BASF SE, Germany) were reacted by a known method at 80° C. to form an NCO-terminated polyurethane polymer having a free isocyanate group content of 2.05 wt %.

Production of Compositions Z-1 to Z-3

In a vacuum mixer, in accordance with the parts by weight (wt %) indicated in Table 1, for all compositions, 2150 g of polymer P-1 and the plasticizer diisodecyl phthalate (DIDP; Palatinol® Z, BASF SE, Germany) were introduced, using 1015 g of DIDP for Z-1, 990 g for Z-2, and 1025 g for Z-3. Thereafter, in the case of inventive composition Z-2, 25 g of 8-hydroxyquinoline (Sigma-Aldrich Chemie GmbH, Switzerland) were added. Thereafter, in all compositions, 15 g of 3-glycidyloxypropyltrimethoxysilane (Silquest* A-187, Momentive Performance Materials AG, Germany) were added, followed by 750 g of carbon black (Monarch® 570, Cabot Corp., USA), 1000 g of kaolin (Satintone® W, BASF SE, Germany), and 50 g of silica (Aerosil® R972, Evonik Industries AG, Germany). This was followed by the addition of the amine catalyst 2,2'-dimorpholinodiethyl ether (DMDEE; Lupragen® N106, BASF SE, Germany), with 5 g added in each of Z-1 and Z-2 and 10 g in Z-3.

Subsequently, in the cases of Z-1 and Z-2, 15 g were added of an organotin(IV) catalyst (dibutyltin diacetate; BNT-CAT 400, BNT Chemicals GmbH, Germany), in the form of a 10 wt % solution in DIDP. The mixer was closed and the contents were stirred under reduced pressure at 1000-1200 revolutions for 20 minutes, and processed to form a homogeneous paste having an overall mass of 5000 g. This paste was then dispensed into internally coated aluminum gun-application cartridges.

TABLE 1

Ingredients in parts by weight (wt %) of inventive composition Z-2 and of reference compositions Z-1 and Z-3.

| Ingredient | Z-1 | Z-2 | Z-3 |
| --- | --- | --- | --- |
| Polymer P-1 | 43 | 43 | 43 |
| DIDP | 20.3 | 19.8 | 20.5 |
| 8-Hydroxyquinoline (10% in DIDP) | — | 0.5 | — |
| Silquest A-187 | 0.3 | 0.3 | 0.3 |
| Monarch 570 | 15 | 15 | 15 |
| Satintone W | 20 | 20 | 20 |
| Aerosil R972 | 1 | 1 | 1 |
| DMDEE | 0.1 | 0.1 | 0.2 |
| Dibutyltin diacetate (10% in DIDP) | 0.3 | 0.3 | — |
| TOTAL | 100 | 100 | 100 |

TABLE 2

Test results for inventive composition Z-2 and for reference compositions Z-1 and Z-3 according to the measurement methods described earlier on above.

| Measurement parameter | Z-1 | Z-2 | Z-3 |
| --- | --- | --- | --- |
| Tensile strength [MPa] | 6.5 | 8.1 | 8.2 |
| Elongation at break [%] | 290 | 300 | 335 |
| Elasticity modulus, 0.5-5% [MPa] | 6.5 | 8.9 | 9.8 |
| G modulus, 10%, [MPa] | 1.6 | 2.8 | 2.6 |
| Extrusion force 7 d RT [N] | 746 | 743 | 723 |
| Extrusion force 7 d 60° C. [N] | 924 | 898 | 854 |
| Extrusion force 14 d 60° C. [N] | 1535 | 1034 | 1016 |
| Extrusion force 21 d 60° C. [N] | 2679 | 1121 | 1077 |

The results of the measurements (Table 2) show that the combination of organotin(IV) catalyst and silane adhesion promoter without chelate complexing agent (reference composition Z-1) have adverse consequences for the mechanical properties (tensile strength and elongation at break) and the stability is inadequate as well (sharp increase in extrusion force). Through inventive addition of a chelate complexing agent as in Z-2, the ultimate properties and storage stability achieved are similar to those in the case of pure amine catalysis (reference Z-3).

TABLE 3

Results of adhesion experiments on different substrates and according to the conditions described earlier on above, for inventive composition Z-2 and for reference compositions Z-1 and Z-3.

| Substrate | Conditions | Z-1 | Z-2 | Z-3 |
| --- | --- | --- | --- | --- |
| Ferro 3402 | 7 d RT | 5 | 5 | 5 |
|  | 14 d RT | 5 | 5 | 5 |
|  | 1 d 80° C. | 1 | 1 | 2 |
| Ferro 14251 | 7 d RT | 2 | 3 | 5 |
|  | 14 d RT | 3 | 3 | 5 |
|  | 1 d 80° C. | 1 | 1 | 1 |
| Ferro 14279 | 7 d RT | 2 | 3 | 4 |
|  | 14 d RT | 4 | 3 | 5 |
|  | 1 d 80° C. | 1 | 1 | 1 |
| Glass air | 7 d RT | 1 | 1 | 1 |
|  | 14 d RT | 1 | 1 | 1 |
|  | 1 d 80° C. | 1 | 1 | 1 |
| Glass tin | 7 d RT | 1 | 1 | 4 |
|  | 14 d RT | 1 | 1 | 4 |
|  | 1 d 80° C. | 1 | 1 | 1 |

The adhesion experiments show clearly that in the context of development of adhesion (7 d RT and more) the inventive composition Z-2 is virtually equivalent with the non-chelate-complexed organotin(IV) catalyst (Z-1) and substantially better than for pure amine catalysis (Z-3). The stabilizing effect of the chelate complexing agent is therefore not at the expense of the development of adhesion.

The invention claimed is:

1. A moisture-curing adhesive composition comprising
    a) at least one polyurethane polymer containing isocyanate groups,
    b) at least one silane adhesion promoter,
    c) at least one amine catalyst, and
    d) at least one chelate complexing agent selected from the group consisting of 1,3-diketones, 1,3-ketoesters, and 1,3-ketoamides.

2. The moisture-curing adhesive composition as claimed in claim 1, wherein the composition comprises at least one metal catalyst.

3. The moisture-curing adhesive composition as claimed in claim 2, wherein the metal catalyst is selected from the group of organotin(IV) compounds, organotitanates or organozirconates.

4. The moisture-curing adhesive composition as claimed in claim 2, wherein the metal catalyst comprises an organotin(IV) compound which is present with a fraction of 0.001 wt % to 0.2 wt %, based on the overall composition.

5. The moisture-curing adhesive composition as claimed in claim 2, wherein the molar ratio between chelate complexing agent and metal catalyst is in the range from 2 to 6.

6. The moisture-curing adhesive composition as claimed in claim 1, wherein the polyurethane polymer containing isocyanate groups is present with a fraction of 10 wt % to 70 wt %.

7. The moisture-curing adhesive composition as claimed in claim 1, wherein the silane adhesion promoter is present with a fraction of 0.01 wt % to 1 wt %, based on the overall composition.

8. The moisture-curing adhesive composition as claimed in claim 1, wherein the amine catalyst is present with a fraction of 0.05 wt % to 1 wt %, based on the overall composition.

9. The moisture-curing adhesive composition as claimed in claim 1, wherein the chelate complexing agent is present with a fraction of 0.01 wt % to 0.5 wt %, based on the overall composition.

10. The moisture-curing adhesive composition as claimed in claim 1, wherein the amine catalyst comprises 2,2'-dimorpholinodiethyl ether or a derivative thereof.

11. The moisture-curing adhesive composition as claimed in claim 1, wherein the silane adhesion promoter is selected from the group of 3-glycidyloxypropyltrimethoxysilane, β-(3,4-epoxycyclohexyl)ethyltrimethoxysilane, 3-mercaptopropyltrimethoxy-silane, and 3-methacryloyloxypropyltrimethoxysilane.

12. A method comprising: applying a moisture-curing adhesive composition as claimed in claim 1 as adhesive or sealant.

13. The method as claimed in claim 12, wherein
the moisture-curing adhesive composition is applied to a mineral substrate, and
the mineral substrate had no pretreatment prior to the application of the moisture-curing adhesive composition.

14. A cured composition obtained from a moisture-curing adhesive composition as claimed in claim 1 after curing thereof with water.

15. The moisture-curing adhesive composition as claimed in claim 1, wherein the at least one chelate complexing agent is selected from 1,3-diketones.

16. The moisture-curing adhesive composition as claimed in claim 1, wherein the at least one chelate complexing agent is selected from 1,3-ketoesters.

17. The moisture-curing adhesive composition as claimed in claim 1, wherein the at least one chelate complexing agent is selected from 1,3-ketoamides.

18. A method for stabilizing a moisture-curing adhesive composition based on polyurethane, comprising a silane adhesion promoter and an amine catalyst, the method comprising: admixing the adhesive composition with a chelate complexing agent selected from the group consisting of 1,3-diketones, 1,3-ketoesters, and 1,3-ketoamides, the weight fraction of the chelate complexing agent being in range of from 0.01 wt % to 0.5 wt % based on the overall composition.

* * * * *